US012794290B1

(12) United States Patent
Palframan et al.

(10) Patent No.: US 12,794,290 B1
(45) Date of Patent: Nov. 10, 2026

(54) OUTRUNNER ROTOR WITH PRE-TENSIONED CARBON FIBER REINFORCEMENT

(71) Applicant: Florida Turbine Technologies, Inc., Jupiter, FL (US)

(72) Inventors: Mark C. Palframan, Jupiter, FL (US); Kyle C. Stoker, North Palm Beach, FL (US)

(73) Assignee: Florida Turbine Technologies Inc., Jupiter, FL (US)

( * ) Notice: Subject to any disclaimer, the term of this patent is extended or adjusted under 35 U.S.C. 154(b) by 220 days.

(21) Appl. No.: 18/665,187

(22) Filed: May 15, 2024

Related U.S. Application Data

(60) Provisional application No. 63/529,620, filed on Jul. 28, 2023.

(51) Int. Cl.

| | |
|---|---|
| ***H02K 1/27*** | (2022.01) |
| ***H02K 1/2792*** | (2022.01) |
| ***H02K 1/28*** | (2006.01) |
| ***H02K 15/03*** | (2006.01) |
| *H02K 7/18* | (2006.01) |

(52) U.S. Cl.
CPC ............. *H02K 1/2792* (2022.01); *H02K 1/28* (2013.01); *H02K 15/03* (2013.01); *H02K 7/1823* (2013.01)

(58) Field of Classification Search
CPC .......... H02K 1/27; H02K 1/2792; H02K 1/28; H02K 7/1823; H02K 15/03
USPC ............ 310/156.37, 156.38, 156.49, 156.55, 310/156.56
See application file for complete search history.

(56) References Cited

U.S. PATENT DOCUMENTS 6,144,130 A * 11/2000 Kawamura ............ H02K 1/278 310/264
12,088,146 B2 * 9/2024 Fatemi ................. H02K 1/2766
2010/0090549 A1 * 4/2010 Gerstler ............... H02K 15/022 310/58
2010/0090557 A1 * 4/2010 El-Refaie ............... H02K 21/22 310/198
2010/0237723 A1 * 9/2010 Gerstler .................... H02K 3/24 310/59
2013/0026861 A1 * 1/2013 Takeuchi ................. H02K 3/47 310/43
2013/0038181 A1 * 2/2013 Takeuchi ................ B60L 50/51 310/68 B
2013/0140937 A1 * 6/2013 Kim .......................... H02K 1/28 310/216.116
2016/0190883 A1 * 6/2016 Maki-Ontto ........... H02K 1/278 310/156.19
2017/0271934 A1 * 9/2017 Creedon ................ H02K 1/274
2019/0115797 A1 * 4/2019 Matsuo .................. H02K 1/278
2020/0198456 A1 * 6/2020 Kawamura ............ H02K 11/21
2021/0044178 A1 * 2/2021 Weber ..................... H02K 11/40
2021/0066984 A1 * 3/2021 Hunstable ................ H02K 1/02
(Continued)

*Primary Examiner* — Rashad H Johnson
(74) *Attorney, Agent, or Firm* — Koenig IP Works, PLLC; Katherine Koenig

(57) ABSTRACT

A pre-tensioned carbon fiber overwrap is applied to the outside diameter of a modular titanium generator outrunner rotor. The pre-tensioned carbon fiber overwrap allows the assembly to achieve higher operating magnet tip speeds and safety margins than conventional outrunner designs. Additionally, the magnets are arranged in a Halbach array so that a high strength titanium rotor yoke can be used in lieu of a magnetic material.

16 Claims, 8 Drawing Sheets

(56) References Cited

U.S. PATENT DOCUMENTS

| | | | | |
|---|---|---|---|---|
| 2022/0216774 | A1* | 7/2022 | Okazaki | H02K 1/276 |
| 2023/0100109 | A1* | 3/2023 | Kitayama | H02K 1/27 310/156.01 |
| 2024/0072587 | A1* | 2/2024 | Thiele | H02K 1/276 |
| 2024/0429762 | A1* | 12/2024 | Azar | F03D 9/25 |

* cited by examiner

OUTRUNNER ROTOR WITH PRE-TENSIONED CARBON FIBER REINFORCEMENT

CROSS-REFERENCE TO RELATED APPLICATIONS

This Application is related to and claims the benefit of U.S. Provisional Application No. 63/529,620, filed Jul. 28, 2023, the entirety of which is incorporated herein by reference.

GOVERNMENT RIGHTS STATEMENT

N/A.

TECHNICAL FIELD

The present technology is related generally to an outrunner rotor.

BACKGROUND

An outer rotor motor is one in which the rotor is located outside the stator, rather than a typical configuration wherein the rotor rotates within the stator. This is sometimes referred to as an "outrunner motor." An outrunner rotor offers several advantages, including a higher torque-to-weight ratio than traditional motors, a higher power-to-weight ratio, low noise, lower cost stator winding, and enhanced durability, and may provide high revolutions per minute (RPM).

However, conventional turbomachinery relies on the base metal properties and structural analysis predictions of the components, including rotating motor or generator components, to optimize the geometry for burst margin. Improved component properties and construction is desired to provide enhanced mechanical capability of the assembly.

SUMMARY

Some embodiments advantageously provide an outrunner rotor, an outrunner motor including an outrunner rotor, and a method of assembling an outrunner motor.

In one embodiment, an outrunner rotor includes: a rotor body, the rotor body having an outer circumference and an inner circumference; a layer of magnetic material that extends around the inner circumference; and an overwrap applied to the outer circumference of the rotor body.

In one aspect of the embodiment, the rotor body is composed of a non-magnetic material.

In one aspect of the embodiment, the layer of magnetic material is mechanically bonded to the inner circumference of the rotor body.

In one aspect of the embodiment, the layer of magnetic material includes a plurality of magnetic elements that are arranged in a Halbach array.

In one aspect of the embodiment, the plurality of magnetic elements are arranged into a plurality of rows, each of the plurality of rows consisting of a plurality of magnetic elements, the plurality of magnetic elements in each row of the plurality of rows having a same polarity, each row of the plurality of rows having a polarity that is out-of-phase from a polarity of an adjacent row.

In one aspect of the embodiment, the overwrap is pre-tensioned.

In one aspect of the embodiment, the overwrap is a pre-tensioned overwrap that comprises a carbon fiber composite filament. In one embodiment, the carbon fiber composite filament is composed of: at least one thermoplastic; and carbon fiber.

In one aspect of the embodiment, the outrunner rotor further includes a circular spring.

In one aspect of the embodiment, the rotor body defines a bore and includes a circumferential lip surrounding an opening of the bore, the circular spring being located between the circumferential lip and the layer of magnetic material.

In one aspect of the embodiment, the circular spring is composed of a nickel-based metal.

In one aspect of the embodiment, the outrunner rotor further includes a circular washer, the circular washer being located between the circular spring and the layer of magnetic material.

In one aspect of the embodiment, the circular washer is composed of stainless steel or ceramic.

In one embodiment, an outrunner motor includes: a stator; and an outrunner rotor configured to rotate around the stator, the outrunner rotor including: a rotor body, the rotor body having an outer circumference and an inner circumference and being composed of a non-magnetic material; a layer of magnetic material affixed to the rotor body and extending around the inner circumference of the rotor body, the layer of magnetic material including a plurality of magnetic elements that are arranged in a Halbach array; and an overwrap applied to the outer circumference of the rotor body, the overwrap being composed of carbon fiber or carbon fiber composite.

In one aspect of the embodiment, the Halbach array is arranged into a plurality of rows consisting of six magnetic elements, the six magnetic elements in a row of the plurality of rows having a same polarity, each row of the plurality of rows having a polarity that is out-of-phase from a polarity of an adjacent row.

In one aspect of the embodiment, the overwrap is a pre-tensioned overwrap that comprises a carbon fiber composite filament.

In one aspect of the embodiment, the carbon fiber composite filament is composed of: at least one thermoplastic; and carbon fiber.

In one aspect of the embodiment, the rotor body defines a bore and includes a circumferential lip surrounding an opening of the bore, the outrunner rotor further includes: a circular spring located immediately adjacent the circumferential lip; and a circular washer located between the circular spring and the layer of magnetic material.

In one aspect of the embodiment, the circular spring is composed of a nickel-based metal and the circular washer is composed of stainless steel or ceramic.

In one embodiment, a method of assembling an outrunner motor includes the steps of: adhering a layer of magnetic material around an inner circumference of a rotor body of an outrunner rotor, the rotor body being composed of a non-magnetic material, the layer of magnetic material including a plurality of magnetic elements arranged in a Halbach array; then applying a pre-tensioned carbon fiber overwrap around an outer circumference of the rotor body to compress the rotor body; and assembling the outrunner rotor to a stator such that the outrunner rotor rotates around the stator and the layer of magnetic material is between the rotor body and the stator when the outrunner motor is in use.

BRIEF DESCRIPTION OF THE DRAWINGS

A more complete understanding of embodiments described herein, and the attendant advantages and features thereof, will be more readily understood by reference to the following detailed description when considered in conjunction with the accompanying drawings wherein.

DETAILED DESCRIPTION

Figure 1:
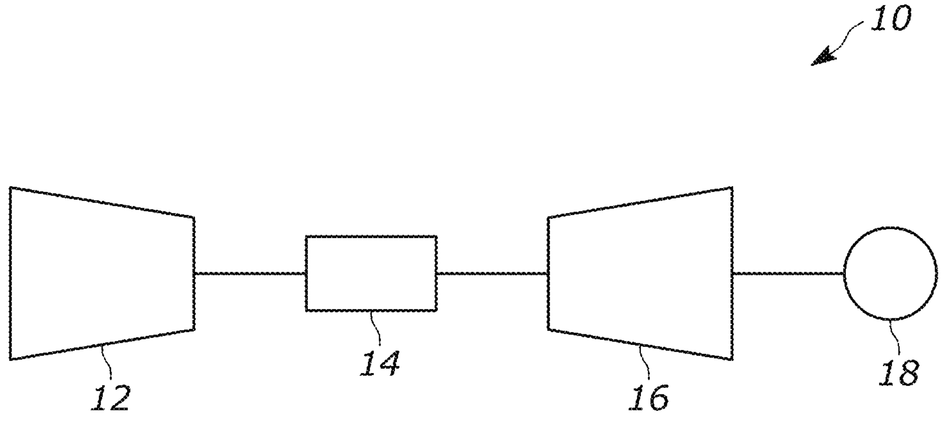
FIG. 1 shows a schematic view of an exemplary turbine engine having an outrunner motor.

Before describing in detail exemplary embodiments, it is noted that the embodiments reside primarily in combinations of apparatus components and steps related to an outrunner rotor and systems including outrunner rotors. Accordingly, the system and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

For high power density generator applications, an outrunner motor configuration may be preferred to reduce the overall size and weight of the generator assembly. The effective magnetic rotor-stator gap can be minimized, since magnet retention material is located on the rotor outer diameter as opposed to in-between the rotor and stator. In one non-limiting example, the outrunner rotor may be used in turbomachinery. In one non-limiting example, the outrunner rotor may be used in a generator assembly.

The outrunner configuration of the present disclosure generally includes a magnetic material located within the inside diameter of a bore of the rotor ("outrunner"), which assembles over the stator. In some embodiments, the outrunner rotor is conventionally machined from a suitable metallic material. In some embodiments, the magnetic material is arranged in a Halbach array, such that the outrunner rotor need not be a magnetically conductive. In some embodiments, the magnetic material is mechanically bonded to the inside diameter of the rotor bore. In some embodiments, a carbon fiber overwrap (in one embodiment, the overwrap is composed of a carbon fiber composite filament including at least one thermoplastic and carbon fiber). In some embodiments, the overwrap is pre-tensioned and wound to the outside diameter of the metallic rotor. In some embodiments, the assembly is installed over the generator stator and utilized to generate electricity or act as a torque-producing motor.

Figure 2:
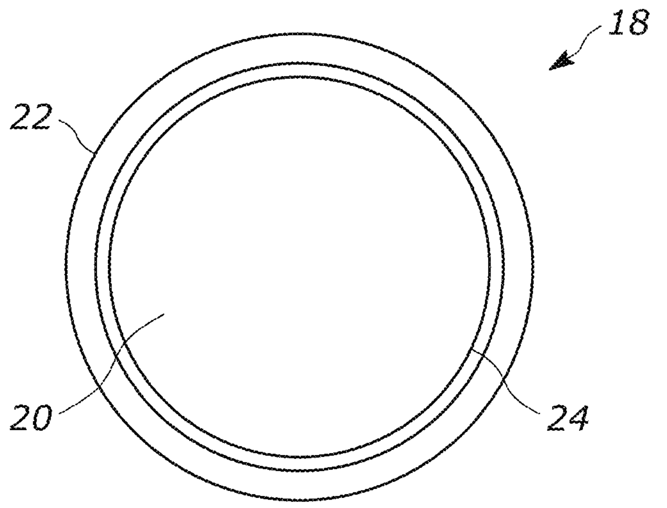
FIG. 2 shows a schematic front view of an exemplary outrunner motor.

Referring now to the figures in which like reference designators are used for like elements, a schematic view of an exemplary turbine engine is shown as a non-limiting example of a system in which an outrunner rotor of the present disclosure may be used is shown in FIG. 1. However, it will be understood that the outrunner rotor may be used in other suitable applications. The exemplary turbine engine 10 shown in FIG. 1 includes a compressor 12, a combustor 14, a turbine 16, and a generator 18. As is discussed in greater detail below, in one embodiment the generator 18 is or includes an outrunner motor with an outer (or outrunner) rotor that rotates around the stator. FIG. 2 shows a schematic view of an exemplary outrunner motor having a stator 20 and an outrunner rotor 22. In one embodiment, there is an air gap 24 between the stator 20 and the outrunner rotor 22. In one embodiment, the stator 20 includes a plurality of wire windings (not shown) that interact with the magnetic field generated by the outrunner rotor 22 to generate torque (mechanical energy) to rotate the motor shaft.

Figure 3:
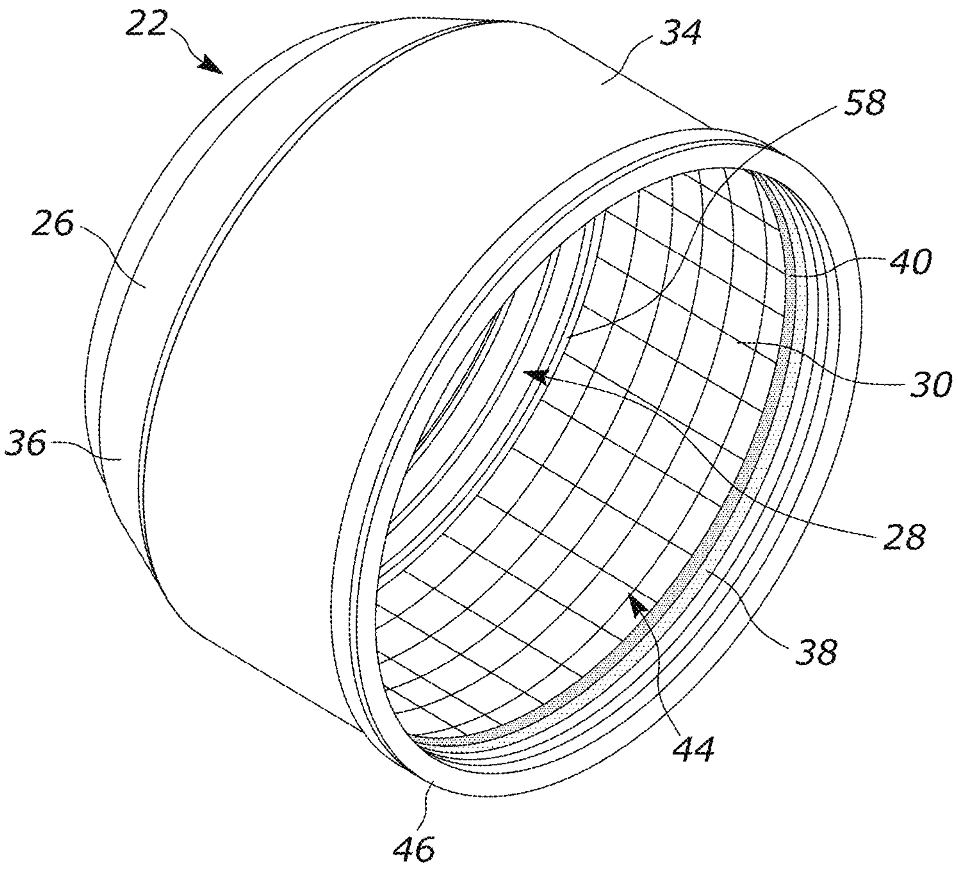
FIG. 3 shows a perspective view of an exemplary outrunner rotor, in accordance with the present disclosure.
Figure 4:
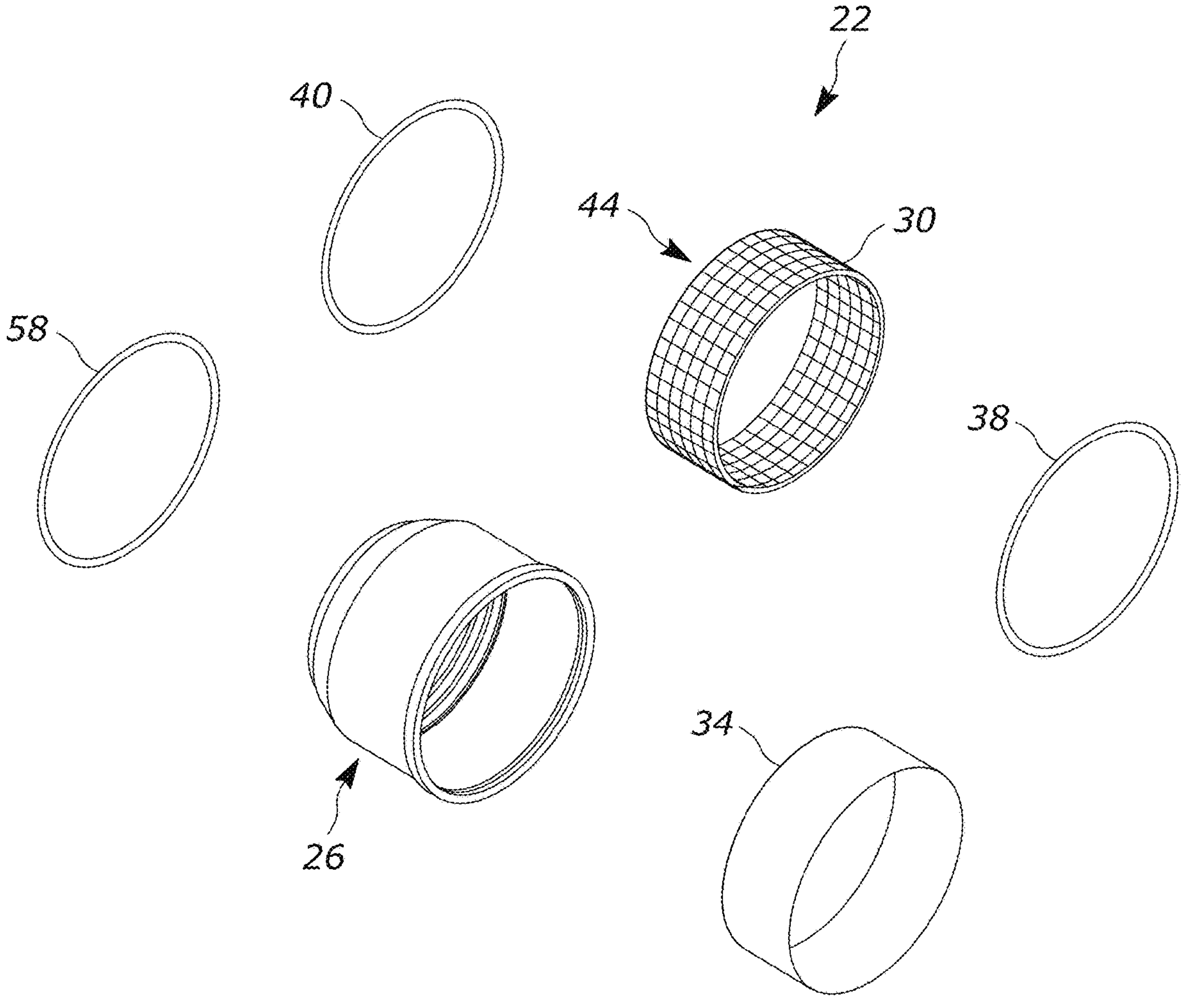
FIG. 4 shows an exploded view of an exemplary outrunner rotor, in accordance with the present disclosure.
Figure 5:
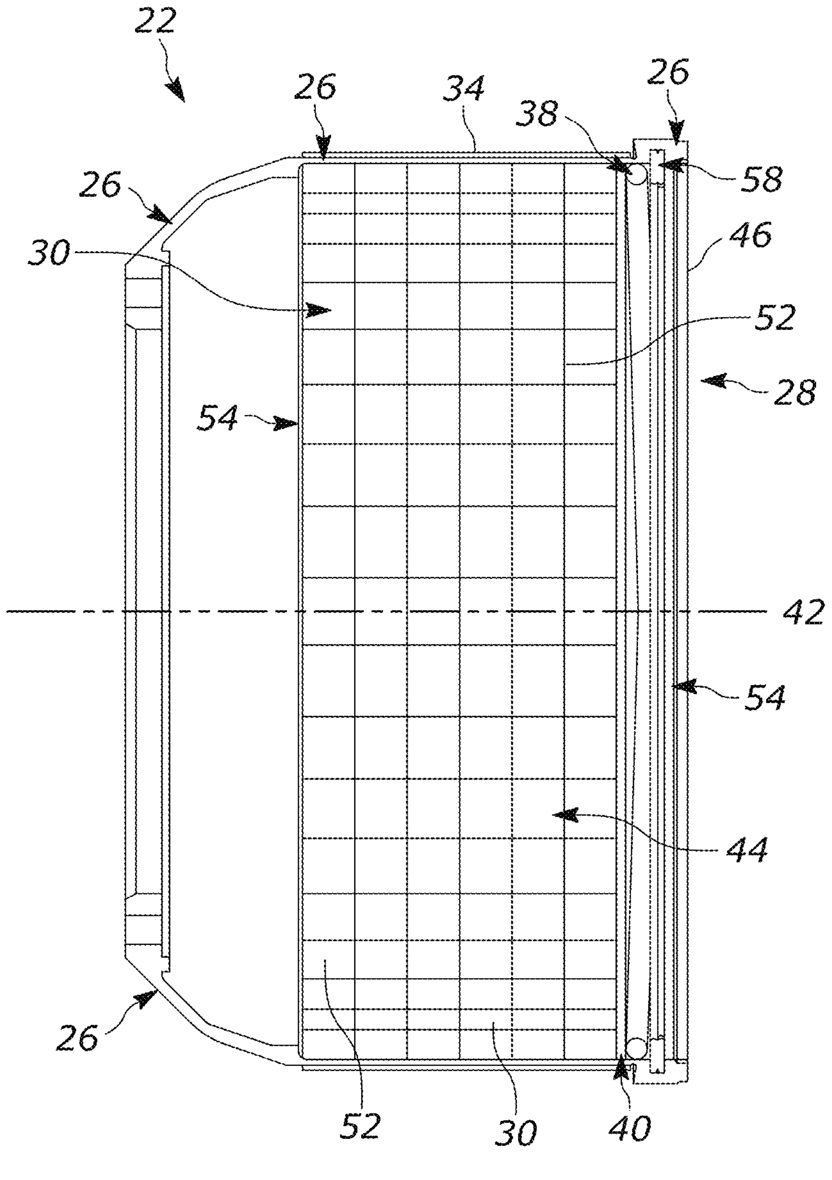
FIG. 5 shows a cross-sectional side view of an exemplary outrunner rotor, in accordance with the present disclosure.

Referring now to FIG. 3-5, an outrunner rotor is shown. FIG. 3 shows a perspective view of an outrunner rotor; FIG. 4 shows an exploded view of an outrunner rotor (components are not necessarily depicted in order of assembly); and FIG. 5 shows a side cross-sectional view of an outrunner rotor. A stator and other motor components are not shown in FIGS. 3-5 for better visualization of the outrunner rotor.

Continuing to refer to FIGS. 3-5, in one embodiment the outrunner rotor 22 includes a rotor body 26 defining a bore 28, a layer of magnetic material 30 that lines, is affixed to, or otherwise extends around an inner circumference 32 of the rotor body 26 (within the bore 28), and an overwrap 34 that surrounds an outer circumference 36 of the rotor body 26. In one embodiment, the outrunner rotor 22 also includes one or more springs 38. In one embodiment each spring 38 is a circular spring. In one embodiment, the outrunner rotor 22 also includes one or more washers 40. In one embodiment, each washer 40 is a circular washer. In one embodiment, the outrunner rotor 22 has a generally cylindrical shape and defines a longitudinal axis 42 that extends along the bore 28.

Continuing to refer to FIGS. 3-5, in one embodiment the rotor body 26 is machined, assembled, or otherwise composed of a suitable metallic material. In one embodiment, the rotor body 26 is composed of a magnetic material; however, in some embodiments the rotor body 26 is composed of one or more non-metallic, paramagnetic, and/or weakly magnetic materials. As discussed below, the layer of magnetic material 30 is arranged in a Halbach array 44, which allows the rotor body 26 to be composed of non-metallic, paramagnetic, and/or weakly magnetic materials. Thus, in some embodiments the rotor body 26 is composed of one or more lower density, but higher strength materials. In one non-limiting example, the rotor body 26 is composed of titanium.

Figure 6:
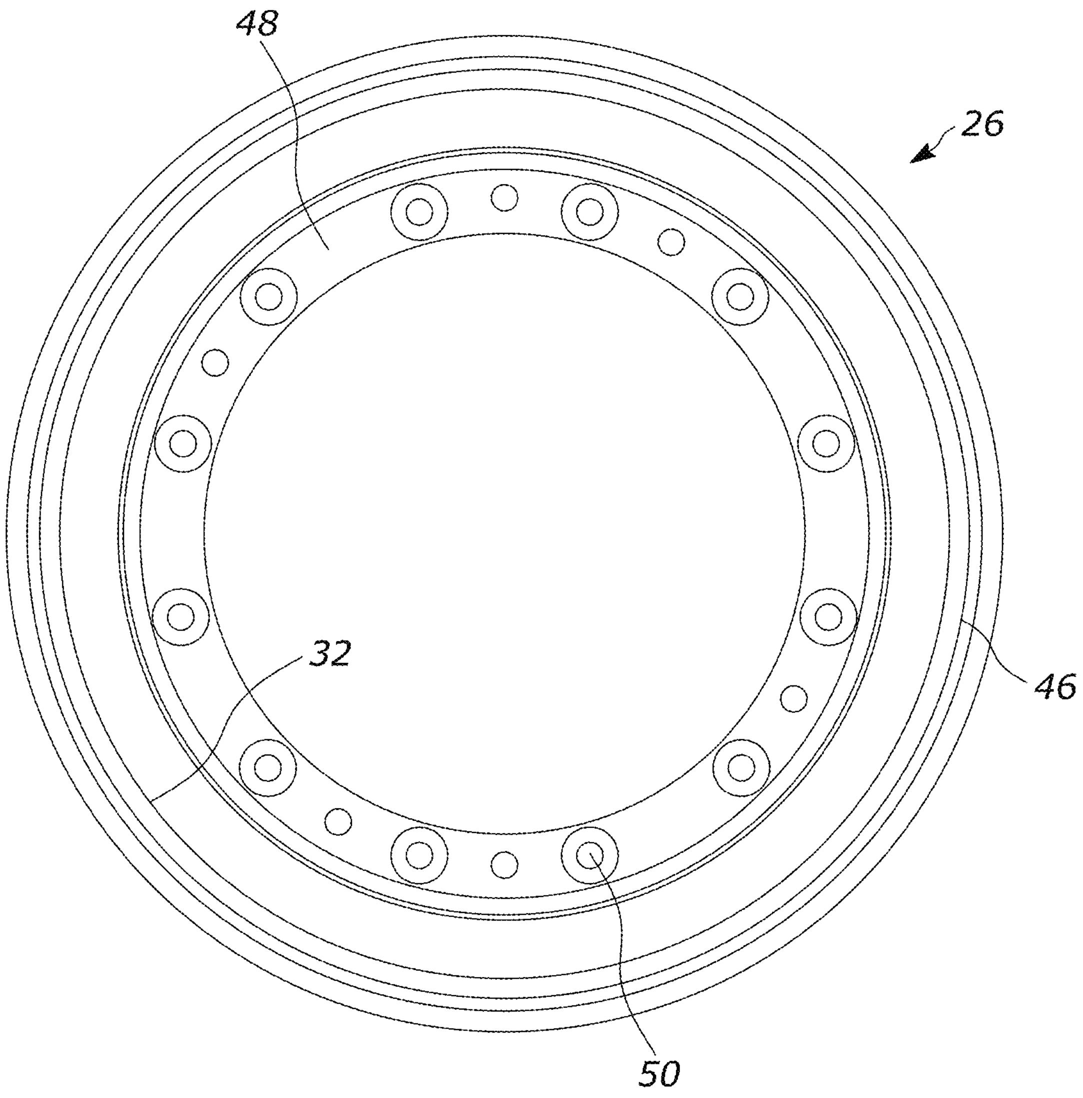
FIG. 6 shows a front view of an exemplary rotor body of an outrunner rotor, in accordance with the present disclosure.

Continuing to refer to FIGS. 3-5, and with reference to FIG. 6, in some embodiments the rotor body 26 includes a circumferential lip 46 that extends around the bore 28 on a first end (that is, surrounds the opening of the bore 28) and a circumferential flange 48 that extends around the bore 28 on a second end and at least partially into the bore 28 to define a partial surface that is oriented at least substantially orthogonally to the longitudinal axis 42. In some embodiments, the circumferential flange 48 defines a plurality of apertures 50 for accepting mounting hardware.

Continuing to refer to FIGS. 3-5, in one embodiment the layer of magnetic material 30 that is affixed to an inner circumference 32 of the rotor body 26 (within the bore 28) is composed of a plurality of magnetic elements 52 arranged in a Halbach array 44. In one embodiment, the layer of magnetic material 30 is mechanically bonded or adhered (for example, glued) to the inner circumference 32 of the rotor body 26. In one embodiment, each magnetic element 52 is a discrete component that is individually affixed to the rotor body 26. Additionally or alternatively, the layer of magnetic material 30 includes at least one piece of flexible, magnetic material that is axially segmented (but not fully divided) into a plurality of magnetic elements 52. In one embodiment, the layer of magnetic material 30 includes a plurality of rows 54, each row 54 being axially segmented into a plurality of magnetic elements 52. In one non-limiting example, each row 54 is segmented into six magnetic elements 52 (for example, as shown in FIG. 5). In this embodiment, the plurality of rows 54 extend around the entire inner circumference 32 of the rotor body 26, and each row 54 is individually affixed to the rotor body 26. As the layer of magnetic material 30 is affixed to the inner circumference 32 of the rotor body 26, the centrifugal force generated by rotation of the outrunner rotor 22 will not cause the layer of magnetic material 30 to separate from the rotor body 26.

Figure 7:
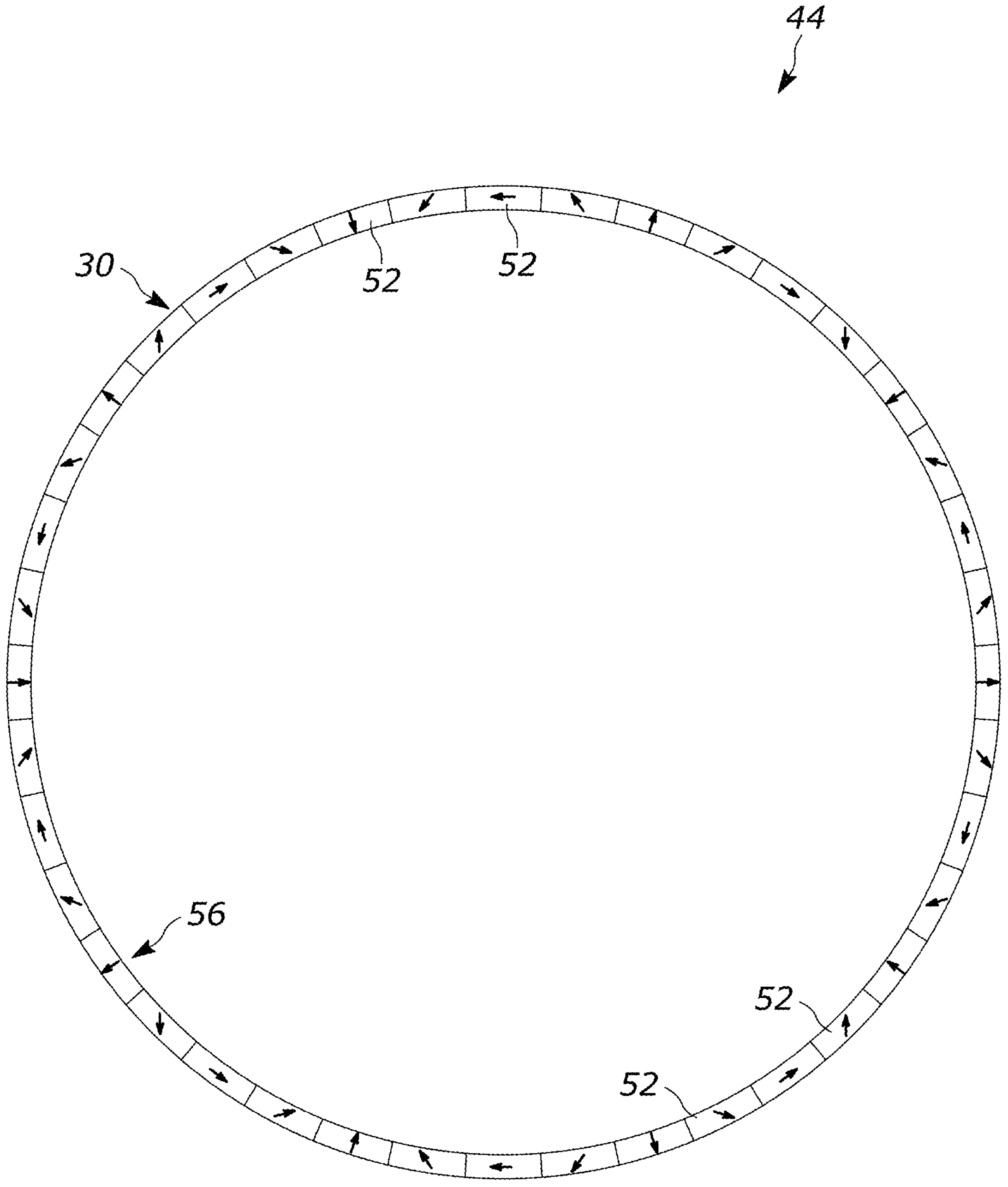
FIG. 7 shows a side view of an exemplary layer of magnetic material arranged in a Halbach array.
Figure 8:
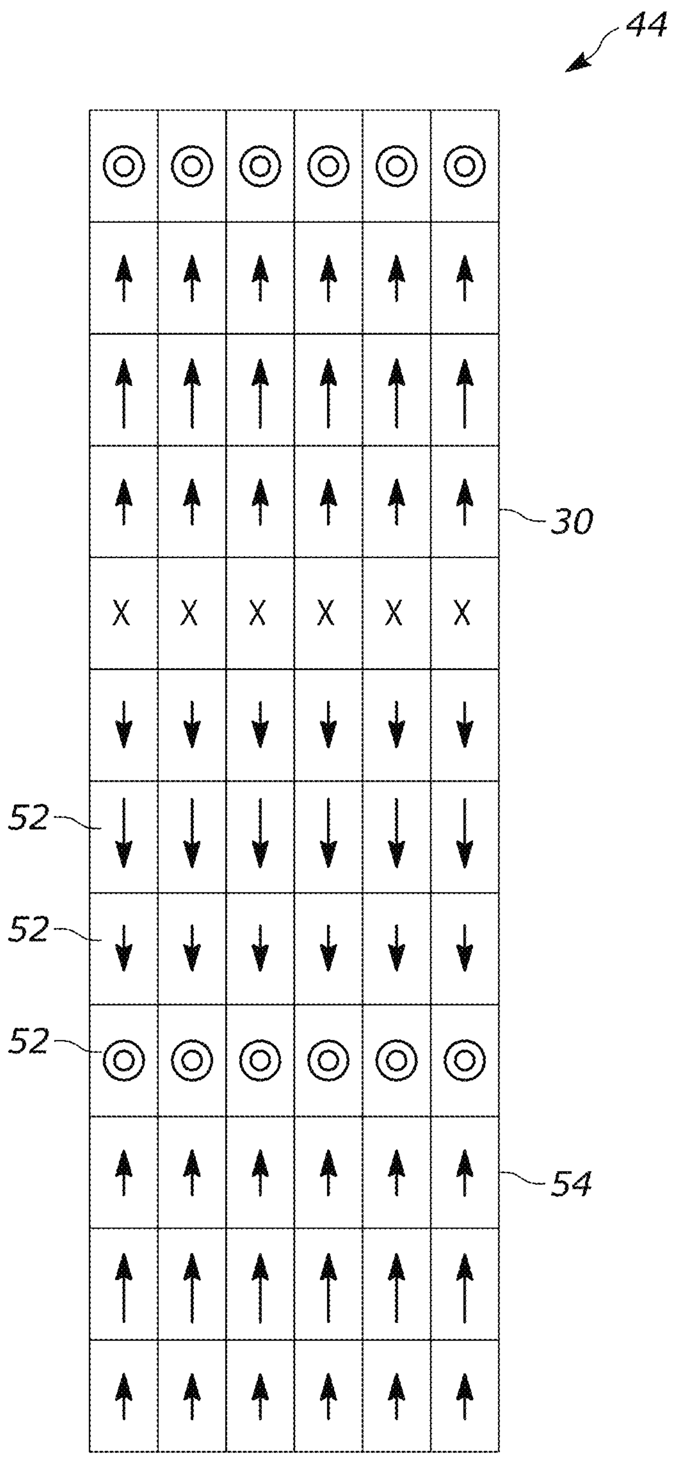
FIG. 8 shows a planar view of a portion of an exemplary Halbach array of an outrunner rotor.

Continuing to refer to FIGS. 3-5, and with reference to FIGS. 6 and 7, each magnetic element 52 is a permanent magnet. Adjacent magnetic elements 52 are oriented out-of-phase such that the Halbach array 44 generates a stronger magnetic field on one side (the "working surface") while reducing the magnetic field on the opposite side (the "non-working surface") to near zero. In one embodiment, the working surface 56, and the magnetic field generated from it, is directed inward and toward the stator 20. In one embodiment, such as that shown in FIGS. 7 and 8, each row 54 of magnetic elements 52 has a single polarity, and adjacent rows 54 are oriented out-of-phase from each other, which configuration reduces eddy current losses. In one embodiment, each row of magnetic elements 52 is arranged such that all of the plurality of magnetic elements 52 in that row 54 have the same polarity, and that row 54 has a polarity (the polarity of all of the magnetic elements 52 in that row 54) that is offset by some degree from the polarity of adjacent rows 54 of magnetic elements 52. For example, in one embodiment, as shown in FIG. 7, one row has a polarity that is oriented from the working surface 56 toward the middle of the Halbach array 44, the adjacent rows 54 each have a polarity that is 45° out of phase from that polarity (for example, each polarity being oriented from the working surface 56 toward the middle of the Halbach array 44, but in opposite directions that are each 45° offset), and so on. However, other offsets may be used. For example, in some embodiments, adjacent polarities are offset by 22.5°. In some embodiments, adjacent polarities are offset by some degree between 0° and 90°. The direction of polarity is indicated with imaginary arrows superimposed over magnetic elements 52 in FIG. 7. FIG. 8 shows a planar view of a portion of the Halbach array 44 (for example, if the layer of magnetic material 30 is laid flat). Arrows are also used in FIG. 8 to indicate polarity, with circles indicating polarity coming toward the viewer, short arrows indicating polarity with an orientation that is 45° therefrom, and X marks indicating polarity going away from the viewer. However it will be understood that other configurations, such as other out-of-phase arrangements, may be used.

Continuing to refer to FIGS. 3-5, in one embodiment an overwrap 34 that surrounds an outer circumference 36 of the rotor body 26 is shown. In one embodiment, the overwrap 34 is positioned at the same general axial location as the layer of magnetic material 30, with the layer of magnetic material 30 being on the inside of the rotor body 26 and the overwrap 34 being on the outside of the rotor body 26. In one embodiment, the overwrap 34 is composed of carbon fiber and/or carbon fiber composite filament that is pre-tensioned and wound around the outer circumference 36 of the rotor body 26. In one embodiment, the overwrap 34 is composed of a carbon fiber composite filament including a thermoplastic combined with a carbon fiber. In one embodiment, the thermoplastic is polyether ether ketone (PEEK) and/or epoxy resin. In one embodiment, the overwrap is composed of or includes glass, Kevlar, aramid, rockwool, basalt fibers, and/or other suitable materials in addition to or instead of carbon fiber. In one embodiment, the overwrap 34 is a band that is composed of a single piece of material. The width, material, and/or tightness of the overwrap 34 around the rotor body 26 is such that the overwrap 34 functions to constrain the magnetic elements 52 of the Halbach array 44 on the inner circumference of the rotor body 26 and to limit deflection and hoop stress of the outrunner rotor 22. Thus, the diameter of the outrunner rotor 22 may be increased. Additionally, because the overwrap 34, as a magnet-retention material, is located on the outside of the outrunner rotor 22, the air gap 24 between the outrunner rotor 22 and the stator 20, and the length of the outrunner rotor 22, may be reduced.

Continuing to refer to FIGS. 3-5, in one embodiment the outrunner rotor 22 includes one or more springs 38. Each of the one or more springs 38 may be a circular spring. The spring 38 maintains compression of the magnetic elements 52. In one embodiment, the spring 38 is sized and configured to provide a load sufficient to resist torque, based on the known displacement pressure, if the glue or adhesive affixing the layer of magnetic material 30 to the rotor body 26 fails. In one embodiment, the spring 38 is positioned around the inner circumference 32 of the rotor body 26 in a location that is adjacent, immediately adjacent, or proximate the circumferential lip 46 of the rotor body 26. If more than one spring 38 is used, they may be located immediately adjacent to each other and/or interspaced with the one or more washers 40. In one embodiment, the spring 38 is composed of metal. In one non-limiting example, the spring 38 is composed of a nickel-based metal and/or nickel alloy, but other suitable heat-resistant materials may be used. In one embodiment, the spring 38 is axially pre-loaded.

Continuing to refer to FIGS. 3-5 in one embodiment, the outrunner rotor 22 also includes one or more washers 40. Each of the one or more washers 40 may be a circular washer. The washer 40 is configured to distribute stress to prevent the load of the spring 38 from exerting too much pressure on the Halbach array 44 (which may crack, break, and/or detach the magnetic elements 52). In one embodiment, the washer 40 is positioned between the spring 38 and the Halbach array 44. In one embodiment, the washer 40 is in contact with each of the spring 38 and the Halbach array 44. If more than one washer 40 are used, they may be located immediately adjacent to each other and/or interspaced with the one or more springs 38. In one embodiment, the washer 40 is composed of stainless steel, but other suitable heat-resistant materials may be used, such as one or more other metals and/or ceramics. In one embodiment, the washer 40 is composed of ceramic.

Continuing to refer to FIGS. 3-5, in one embodiment, the outrunner rotor 22 also includes one or more constant section retaining rings 58 (or snap rings 58) adjacent to the Halbach array 44 on the opposite side of the Halbach array 44 to the one or more circular springs 38 and one or more circular washers 40 (for example, as shown in FIG. 3). Each of the one or more snap rings 58 may be a circular or at least substantially circular snap ring. Each of the one or more snap rings 58 may be a complete circle or an incomplete circle. In embodiment, the one or more snap rings 58 help retain and maintain compression of the magnetic elements 52 and act against the spring(s) 38 and washer(s) 40.

In one embodiment, the one or more springs 38, the one or more washers 40, and the one or more snap rings 58 allow the outrunner motor to operate at a temperature that is above the temperature at which the glue or adhesive affixing the layer of magnetic material 30 to the rotor body 26 would fail. Even if the glue or adhesive fails, the spring(s) 38, the washer(s) 40, and/or the snap ring(s) 58 in combination with the circumferential flange 48, hold the magnetic elements 52 in place.

Figure 9:
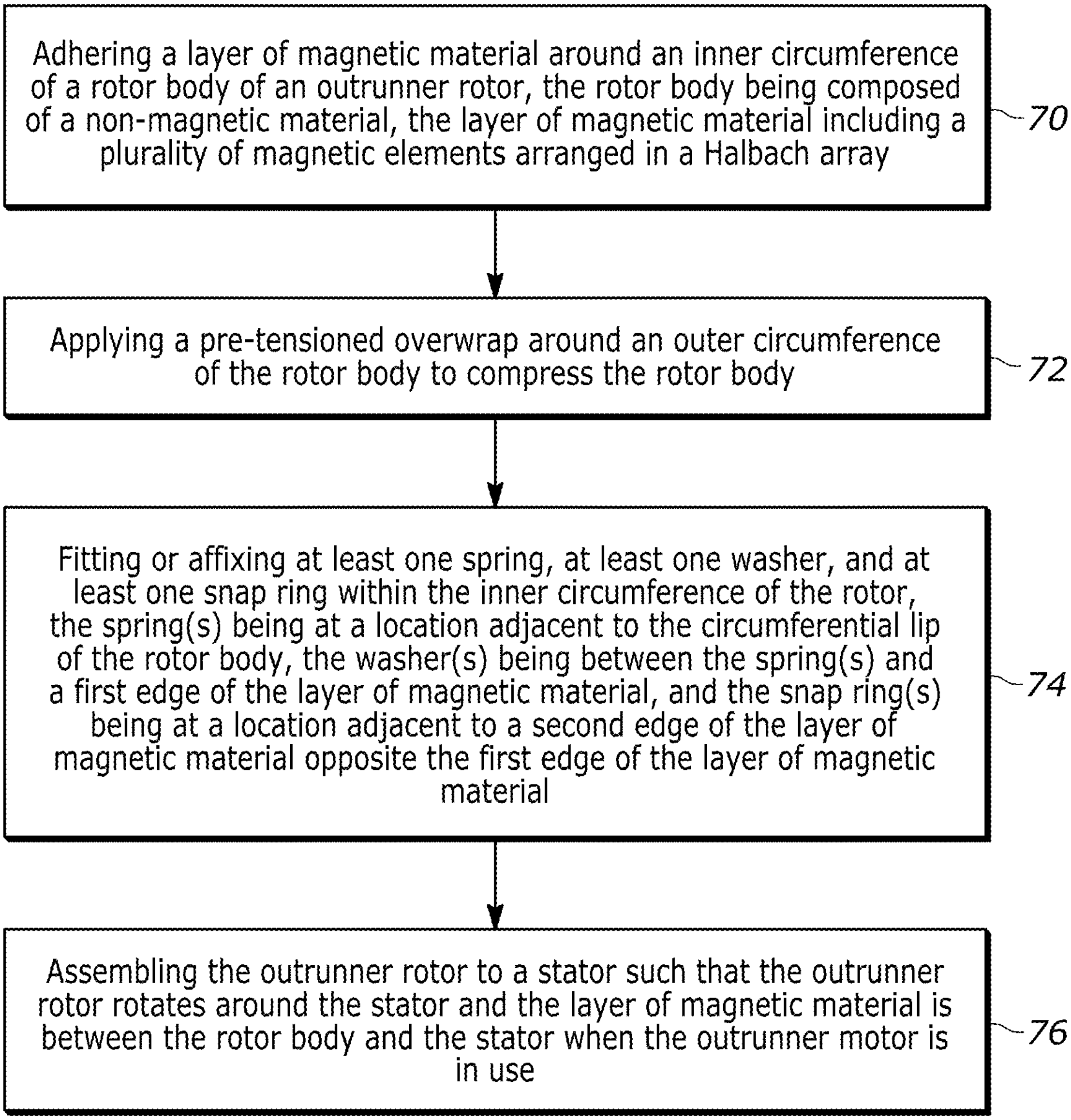
FIG. 9 shows an exemplary method of assembling an outrunner motor.

Referring now to FIG. 9, an exemplary method of assembling an outrunner motor is shown. In an exemplary first step 70, a layer of magnetic material 30 is adhered around an inner circumference 32 of a rotor body 26 of an outrunner rotor 22 (in one non-limiting example, the layer of magnetic material 30 is glued to the inner circumference 32 of the rotor body 26). In one embodiment, the rotor body 26 is composed of a non-magnetic material and the layer of magnetic material 30 includes a plurality of magnetic elements arranged in a Halbach array. In an exemplary second step 72, a pre-tensioned overwrap 34 is applied around an outer circumference 36 of the rotor body 26 to compress the rotor body 26. In one embodiment, the pre-tensioned overwrap 34 is a carbon fiber composite overwrap and is applied around the outer circumference 36 of the rotor body 26 after the layer of magnetic material 30 has been adhered to the inner circumference 32 of the rotor body 26. In one embodiment, the overwrap 34 is a carbon fiber composite filament that is wound around the outer circumference of the rotor body in several revolutions. In an exemplary third step 74, one or more springs 38 are fitted and/or affixed within the inner circumference 32 of the rotor body 26 at a position that is adjacent, immediate adjacent, or proximate the circumferential lip 46 of the rotor body 26. Additionally, one or more washers 40 are fitted and/or affixed within the inner circumference 32 of the rotor body 26 at a position that is between the spring(s) 38 and a first edge of the layer of magnetic material 30. Additionally, one or more snap rings 58 are fitted and/or affixed within the inner circumference 32 of the rotor body 26 at a position that is adjacent, immediately adjacent, or proximate a second edge of the layer of magnetic material 30 that is opposite the first edge of the layer of magnetic material 30. In an exemplary fourth step 76, the outrunner rotor 22 is assembled to a stator such that the outrunner rotor 22 rotates around the stator and the layer of magnetic material 30 is between the rotor body 26 and the stator when the outrunner motor is in use.

EMBODIMENTS

In one embodiment, the outrunner rotor includes a magnetic material located within the inside diameter of a bore, which assembles over the stator. In some embodiments, the magnetic material is arranged in a Halbach array, such that the outrunner rotor need not be a magnetically conductive. In some embodiments, the magnetic material is mechanically bonded to the inside diameter of the outrunner bore. In some embodiments, a carbon fiber composite filament (PEEK or epoxy resin+Carbon Fiber) is pre-tensioned and wound to the outside diameter of the metallic rotor. In some embodiments, the assembly is installed over the generator stator and utilized to generate electricity or act as a torque producing motor.

A pre-tensioned carbon fiber overwrap is applied to the outside diameter of a modular titanium generator outrunner rotor. The pre-tensioned carbon fiber overwrap allows the assembly to achieve higher operating magnet tip speeds and safety margins than conventional outrunner designs. Additionally, in some embodiments the magnets are arranged in a Halbach array so that a high strength titanium rotor yoke can be used in lieu of a magnetic material.

In one embodiment, an outrunner rotor includes: a rotor, the rotor having an outside diameter; a magnetic material; and a pre-tensioned carbon fiber overwrap applied to the outside diameter of the rotor.

In one aspect of the embodiment, the magnetic material is mechanically bonded to an inside diameter of the bore.

In one aspect of the embodiment, the magnetic material is arranged in a Halbach array.

In one aspect of the embodiment, the pre-tensioned carbon fiber overwrap comprises a carbon fiber composite filament.

In one aspect of the embodiment, the carbon fiber composite filament is composed of: at least one of PEEK and epoxy resin; and carbon fiber.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention.

What is claimed is:

1. An outrunner rotor, the outrunner rotor comprising:

a rotor body, the rotor body having an outer circumference and an inner circumference;

a layer of magnetic material that extends around the inner circumference, the layer of magnetic material including a plurality of magnetic elements that are arranged in a Halbach array, the plurality of magnetic elements being arranged into a plurality of rows, each of the plurality of rows consisting of a plurality of magnetic elements, the plurality of magnetic elements in each row of the plurality of rows having the same polarity, each row of the plurality of rows having a polarity that is out-of-phase from a polarity of an adjacent row; and an overwrap applied to the outer circumference of the rotor body.

2. The outrunner rotor of claim 1, wherein the rotor body is composed of a non-magnetic material.

3. The outrunner rotor of claim 1, wherein the layer of magnetic material is mechanically bonded to the inner circumference of the rotor body.

4. The outrunner rotor of claim 1, wherein the overwrap is pre-tensioned.

5. The outrunner rotor of claim 1, wherein the overwrap is a pre-tensioned overwrap that comprises a carbon fiber composite filament.

6. The outrunner rotor of claim 5, wherein the carbon fiber composite filament is composed of:

at least one thermoplastic; and carbon fiber.

7. An outrunner rotor, the outrunner rotor comprising:

a rotor body, the rotor body having an outer circumference and an inner circumference;

a layer of magnetic material that extends around the inner circumference of the rotor body;

an overwrap applied to the outer circumference of the rotor body; and a circular spring, the rotor body defining a bore and including a circumferential lip surrounding an opening of the bore, the circular spring being located between the circumferential lip and the layer of magnetic material.

8. The outrunner rotor of claim 7, wherein the circular spring is composed of a nickel-based metal.

9. The outrunner rotor of claim 7, further comprising a circular washer, the circular washer being located between the circular spring and the layer of magnetic material.

10. The outrunner rotor of claim 9, wherein the circular washer is composed of stainless steel or ceramic.

11. An outrunner motor, the outrunner motor comprising:

a stator; and an outrunner rotor configured to rotate around the stator, the outrunner rotor including:

a rotor body, the rotor body having an outer circumference and an inner circumference and being composed of a non-magnetic material;

a layer of magnetic material affixed to the rotor body and extending around the inner circumference of the rotor body, the layer of magnetic material including a plurality of magnetic elements that are arranged in a Halbach array, the Halbach array being arranged into a plurality of rows consisting of six magnetic elements, the six magnetic elements in a row of the plurality of rows having a same polarity, each row of the plurality of rows having a polarity that is out-of-phase from a polarity of an adjacent row; and an overwrap applied to the outer circumference of the rotor body, the overwrap being composed of carbon fiber or carbon fiber composite.

12. The outrunner motor of claim 11, wherein the overwrap is a pre-tensioned overwrap that comprises a carbon fiber composite filament.

13. The outrunner motor of claim 12, wherein the carbon fiber composite filament is composed of:

at least one thermoplastic; and carbon fiber.

14. An outrunner motor, the outrunner motor comprising:

a stator; and an outrunner rotor configured to rotate around the stator, the outrunner rotor including:

a rotor body, the rotor body having an outer circumference and an inner circumference and being composed of a non-magnetic material;

a layer of magnetic material affixed to the rotor body and extending around the inner circumference of the rotor body, the layer of magnetic material including a plurality of magnetic elements that are arranged in a Halbach array; and an overwrap applied to the outer circumference of the rotor body, the overwrap being composed of carbon fiber or carbon fiber composite, the rotor body defining a bore and including a circumferential lip surrounding an opening of the bore, the outrunner rotor further including:

a circular spring located immediately adjacent the circumferential lip; and a circular washer located between the circular spring and the layer of magnetic material.

15. The outrunner motor of claim 14, wherein the circular spring is composed of a nickel-based metal and the circular washer is composed of stainless steel or ceramic.

16. A method of assembling an outrunner motor, the method comprising the steps of:

adhering a layer of magnetic material around an inner circumference of a rotor body of an outrunner rotor, the rotor body being composed of a non-magnetic material, the layer of magnetic material including a plurality of magnetic elements arranged in a Halbach array, the plurality of magnetic elements being arranged into a plurality of rows, each of the plurality of rows consisting of a plurality of magnetic elements, the plurality of magnetic elements in each row of the plurality of rows having a same polarity, each row of the plurality of rows having a polarity that is out-of-phase from a plurality of an adjacent row;

then applying a pre-tensioned carbon fiber overwrap around an outer circumference of the rotor body to compress the rotor body; and assembling the outrunner rotor to a stator such that the outrunner rotor rotates around the stator and the layer of magnetic material is between the rotor body and the stator when the outrunner motor is in use.

* * * * *